(12) United States Patent
Kim et al.

(10) Patent No.: US 9,900,498 B2
(45) Date of Patent: Feb. 20, 2018

(54) GLASS-TYPE TERMINAL AND METHOD FOR CONTROLLING THE SAME

(71) Applicant: LG ELECTRONICS INC., Seoul (KR)

(72) Inventors: Taeseong Kim, Seoul (KR); Yujune Jang, Seoul (KR); Jeongyoon Rhee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 23 days.

(21) Appl. No.: 14/609,245

(22) Filed: Jan. 29, 2015

(65) Prior Publication Data
US 2015/0381885 A1  Dec. 31, 2015

(30) Foreign Application Priority Data

Jun. 25, 2014 (KR) ........................ 10-2014-0078328

(51) Int. Cl.
*H04N 5/222* (2006.01)
*H04N 5/232* (2006.01)
*H04N 1/00* (2006.01)
*H04N 1/32* (2006.01)

(52) U.S. Cl.
CPC ..... *H04N 5/23219* (2013.01); *H04N 1/00129* (2013.01); *H04N 1/00212* (2013.01); *H04N 1/00564* (2013.01); *H04N 1/32117* (2013.01); *H04N 5/23222* (2013.01); *H04N 5/23293* (2013.01)

(58) Field of Classification Search
CPC ........... H04N 5/23219; H04N 1/00129; H04N 1/00212; H04N 5/23293
See application file for complete search history.

(56) References Cited

U.S. PATENT DOCUMENTS

| | | | | |
|---|---|---|---|---|
| 2010/0110368 A1* | 5/2010 | Chaum | ................ | G02B 27/017 351/158 |
| 2013/0044291 A1* | 2/2013 | Kato | .................... | A61B 3/0025 351/209 |
| 2014/0078049 A1* | 3/2014 | Parshionikar | ........... | G06F 3/017 345/156 |

* cited by examiner

*Primary Examiner* — Twyler Haskins
*Assistant Examiner* — Carramah J Quiett
(74) *Attorney, Agent, or Firm* — Birch, Stewart, Kolasch & Birch, LLP

(57) ABSTRACT

A glass-type mobile terminal including a frame body configured to be worn as glasses by a user; a camera mounted on the frame body and configured to capture an image; and a controller configured to control the camera to capture at least one image of an object currently viewed with the glass-type mobile terminal based on at least one of linguistic expression information of the user and emotion information of the user on the currently viewed object.

13 Claims, 10 Drawing Sheets

GLASS-TYPE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Application No. 10-2014-0078328, filed on Jun. 25, 2014, the contents of which is incorporated by reference herein in its entirety.

BACKGROUND OF THE INVENTION

1. Field of the Invention

The present invention relates to a terminal configured to be wearable on a user's head.

2. Description of the Conventional Art

Terminals may be generally classified as mobile/portable terminals or stationary terminals. Mobile terminals may also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

A recent glass-type mobile terminal is configured as a wearable device that the user can wear. An example of such wearable device is a glass-type terminal. The glass-type terminal may be provided with a camera and various images may be captured through the camera.

SUMMARY OF THE INVENTION

Accordingly, an object of the present invention is to address problems with the related art terminals.

To achieve these and other advantages and in accordance with the purpose of the present invention, as embodied and broadly described herein, the present invention provides in one aspect a glass-type mobile terminal including a frame body configured to be worn as glasses by a user; a camera mounted on the frame body and configured to capture an image; and a controller configured to control the camera to capture at least one image of an object currently viewed with the glass-type mobile terminal based on at least one of linguistic expression information and emotion information of the user on the currently viewed object.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings, which are given by illustration only, and thus are not limitative of the present invention, and wherein.

DETAILED DESCRIPTION OF THE PREFERRED EMBODIMENTS

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings. It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
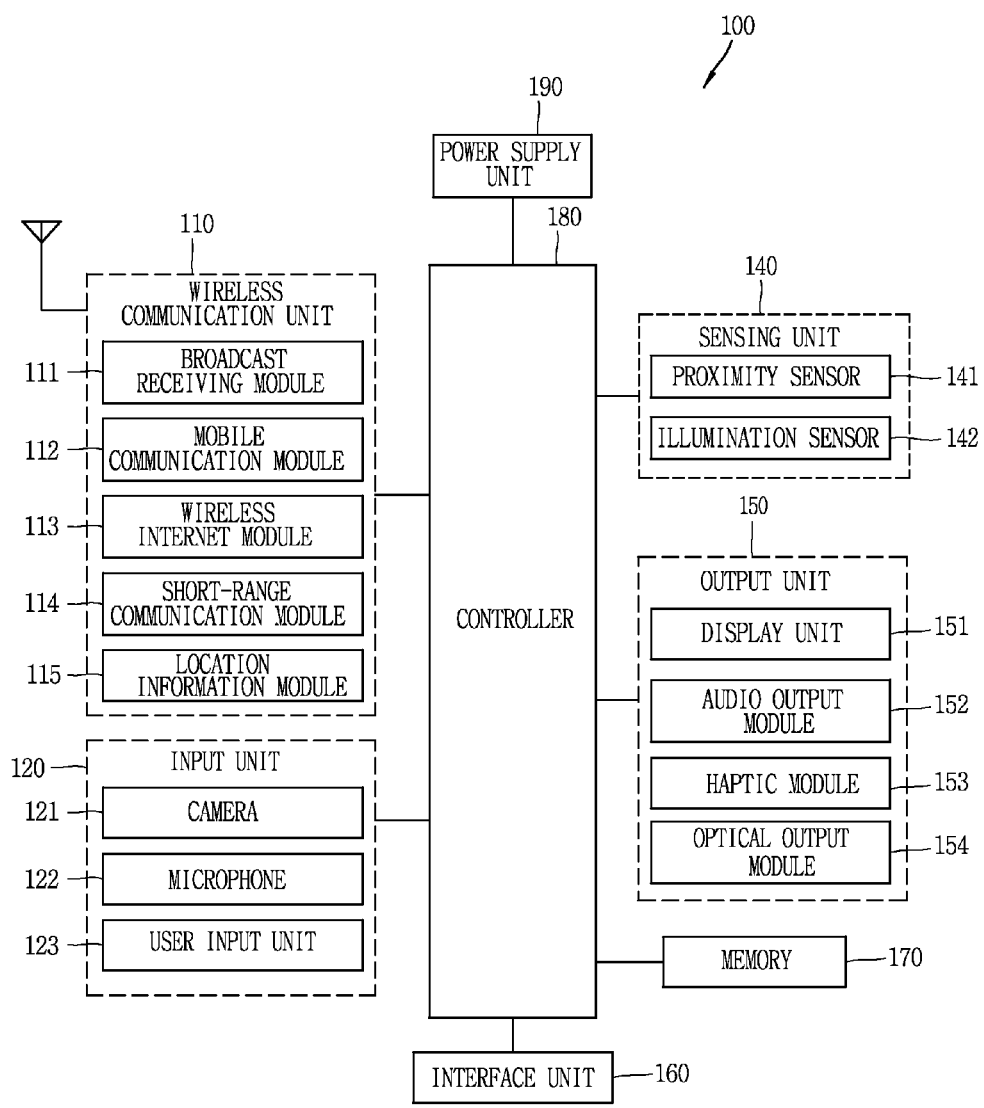
FIG. 1 is a block diagram illustrating a glass-type terminal according to an embodiment of the present invention.

FIG. 1 is a block diagram illustrating the configuration of a glass-type mobile terminal 100 according to an embodiment of the present invention. Referring to FIG. 1, the glass-type mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1, the wireless communication unit 110 typically includes one or more modules which permit communications such as wireless communications between the glass-type mobile terminal 100 and a wireless communication system, communications between the glass-type mobile terminal 100 and another mobile terminal, communications between the glass-type mobile terminal 100 and an external server. Further, the wireless communication unit 110 typically includes one or more modules which connect the glass-type mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 280 according to device parameters, user commands, and combinations thereof.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), a chemical sensor (for example, an electronic nose, a health care sensor, a biometric sensor, and the like), a heart rate detecting sensor, a sensor for sensing brain waves indicative of a user's emotion state, and a sensor (electronic patch) for sensing shivering of muscles (or skin). The glass-type mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the glass-type mobile terminal 100 and a user, as well as function as the user input unit 123 which provides an input interface between the glass-type mobile terminal 100 and the user.

The interface unit 160 serves as an interface with various types of external devices that can be coupled to the glass-type mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the glass-type mobile terminal 100 may perform assorted control functions associated with a connected external device, in response to the external device being connected to the interface unit 160.

The memory 170 is typically implemented to store data to support various functions or features of the glass-type mobile terminal 100. For instance, the memory 170 may be configured to store application programs executed in the glass-type mobile terminal 100, data or instructions for operations of the glass-type mobile terminal 100, and the like. Some of these application programs may be downloaded from an external server via wireless communication. Other application programs may be installed within the glass-type mobile terminal 100 at time of manufacturing or shipping, which is typically the case for basic functions of the glass-type mobile terminal 100 (for example, receiving a call, placing a call, receiving a message, sending a message, and the like). It is common for application programs to be stored in the memory 170, installed in the glass-type mobile terminal 100, and executed by the controller 280 to perform an operation (or function) for the glass-type mobile terminal 100.

The controller 180 typically functions to control overall operation of the glass-type mobile terminal 100, in addition to the operations associated with the application programs. The controller 180 can provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the glass-type mobile terminal 100. The power supply unit 190 may include a battery, and the battery may be configured to be embedded in the terminal body, or configured to be detachable from the terminal body.

At least part of the above components may cooperate with each other, so as to control an operation of a glass-type mobile terminal according to various embodiments to be explained later. A method of controlling a glass-type mobile terminal may be implemented on the mobile terminal, by driving at least one application program stored in the memory 170.

Figure 2:
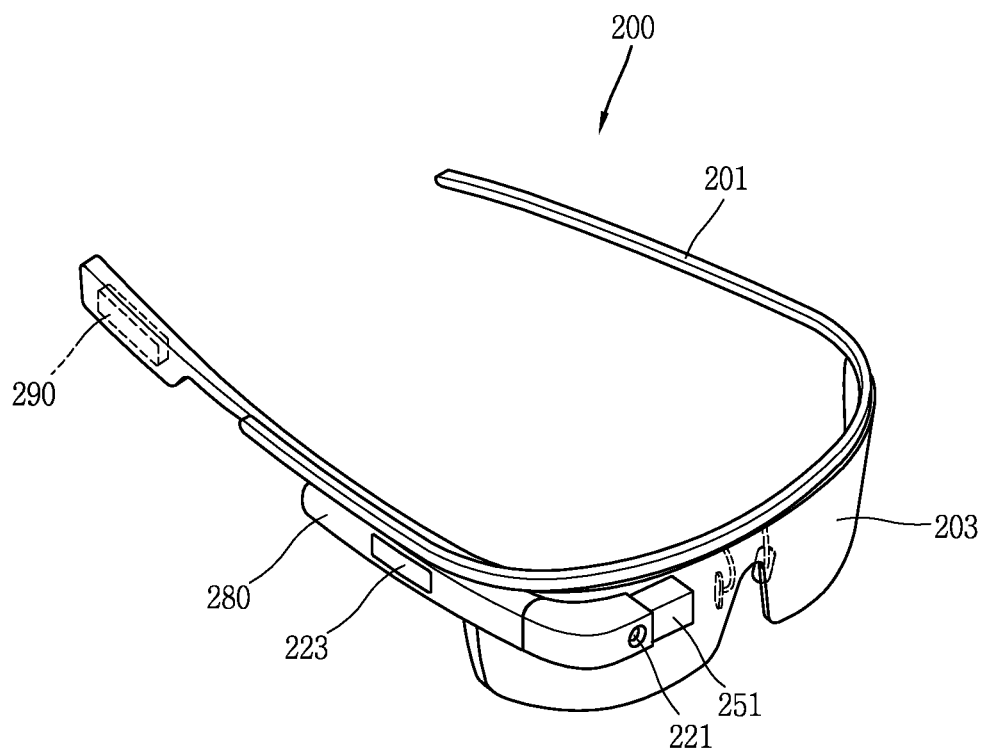
FIG. 2 is a view schematically illustrating a glass-type terminal according to an embodiment of the present invention.

FIG. 2 is a perspective view illustrating one example of a glass-type mobile terminal 200 according to an embodiment. The glass-type mobile terminal 200 can be wearable on a head of a human body and provided with a frame 201 (case, housing, etc.) therefor. The frame may be made of a flexible material to be easily worn. The frame of glass-type mobile terminal 200 is shown having a first frame and a second frame, which can be made of the same or different materials.

The frame 201 may be supported on the head and defines a space for mounting various components. As illustrated, electronic components, such as a controller 280, a power supply unit 290 and an audio output module, may be mounted to the frame 201. Also, a lens 203 for covering either or both of the left and right eyes may be detachably coupled to the frame.

The controller 280 controls various electronic components disposed in the glass-type mobile terminal 200. The control module 280 may be understood as a component corresponding to the aforementioned controller 180. FIG. 2 illustrates that the controller 280 is installed in the frame part on one side of the head, but other locations are possible.

The display unit 251 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 200, the display unit 251 may be located to correspond to either or both of the left and right eyes. FIG. 2 illustrates that the display unit 251 is located on a portion corresponding to the right eye to output an image viewable by the user's right eye.

The display unit 251 may project an image into the user's eye using a prism. Also, the prism may be formed from optically transparent material such that the user can view both the projected image and a general visual field (a range that the user views through the eyes) in front of the user. In such a manner, the image output through the display unit 251 may be viewed while overlapping with the general visual field. The glass-type mobile terminal 200 may provide an augmented reality (AR) by overlaying a virtual image on a realistic image or background using the display.

The camera 221 may be located adjacent to either or both of the left and right eyes to capture an image. Since the camera 221 is located adjacent to the eye, the camera 221 can acquire a scene that the user is currently viewing.

The glass-type terminal 200 may be configured to further include a camera disposed close to one of left and right eyes to detect a user's eyeline (the left or right eye) and a user's facial expression. Hereinafter, such a camera for detecting a user's eyeline and facial expression will be named and referred to as a second camera.

In the drawings, the camera 221 is provided at the controller 280. However, the present invention is not limited to this. The camera 221 may be positioned at the frame, or multiple cameras may be utilized. Such multiple cameras may be used to acquire a stereoscopic image.

The glass-type mobile terminal 200 may include the user input unit 223, which can each be manipulated by the user to provide an input. The user input unit 223 may employ techniques which permit input via a tactile input. Typical tactile inputs include a touch, push, or the like. The user input unit 223 is shown operable in a touching manner as it is located on the frame. If desired, glass-type mobile terminal 200 may include a microphone which processes input sound into electric audio data.

The glass-type mobile terminal 200 may include an audio output module for outputting audio. The audio output module may be configured to produce audio in a general audio output manner or an osteoconductive manner. When the audio output module is implemented in the osteoconductive manner, the audio output module may be closely adhered to the head when the user wears the glass-type mobile terminal 200 and vibrate the user's skull to transfer sounds. In this instance, the audio output module may be provided at the same insertion part as that of the microphone.

Hereinafter, a glass-type terminal and a method for controlling the same will be explained, the method including detecting a user's emotion information and/or a user's linguistic expression information on an interest object, automatically capturing an image (an interest image) corresponding to the interest object based on the user's emotion information and/or the user's linguistic expression information, and providing (sharing) the interest image, and the interest information including the user's emotion information and/or the user's linguistic expression information so that the user may confirm and/or share not only the interest image, but also the emotion information and the linguistic expression information on the interest information.

Figure 3:
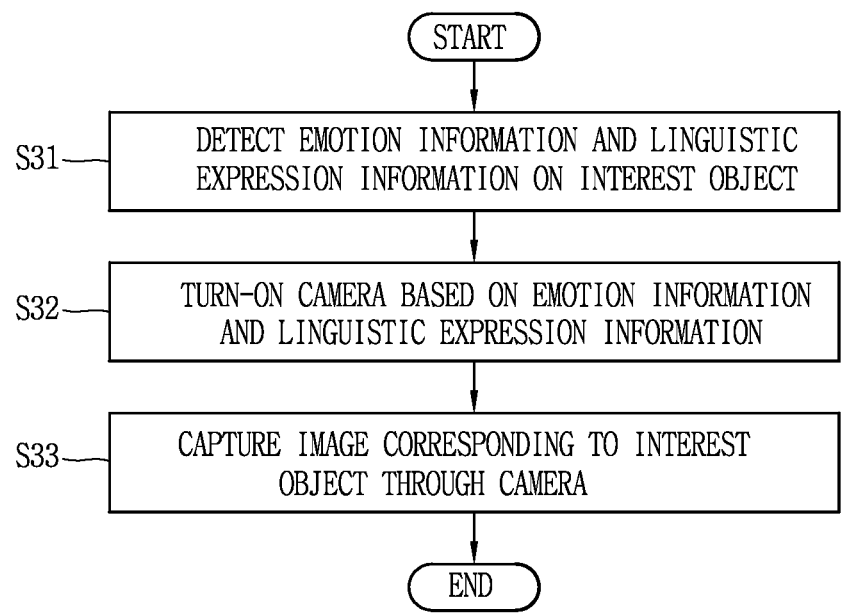
FIG. 3 is a flowchart illustrating a control method according to an embodiment of the present invention.

FIG. 3 is a flowchart illustrating a control method according to an embodiment of the present invention. First, a detecting unit detects real time user's emotion information and user's linguistic expression information on an interest object (S31). The detecting unit may include a second camera configured to capture a user's facial expression (for instance, smiley, angry and sad expressions) on the interest object; a recognition unit configured to recognize the facial expression captured through the second camera; and a microphone configured to receive a voice corresponding to a user's utterance on the interest object. The recognition unit is configured to output to the controller 280 as a user's emotion information on the interest object, a model matching the captured facial expression (for instance, smiley expression) among preset expression models corresponding to the user's various facial expressions. The controller 280 recognizes a voice (for instance, wow!, good and the like) on the interest object received through the microphone 122 as a user's linguistic expression information.

The controller 280 can turn on the camera 221 when the user's emotion information and/or the user's linguistic expression information is detected (S32), and automatically capture an image corresponding to the interest object through the camera (S33). For instance, the controller 280 can capture, through the camera 221, an image (an interest image) corresponding to the interest object, e.g., a product, a building, a person and a signboard. The image corresponding to the interest object may be a still image or a video.

The controller 280 can be configured to turn on the camera 221 when the user's emotion information and/or the user's linguistic expression information is detected, and capture through the camera 221 a person who is on the current position or an owner of a peripheral device as the interest information.

The controller 280 can be configured to automatically capture an image corresponding to the interest object through the camera 221 when the camera 221 focuses on the interest object for a preset time (for instance, 2-3 seconds). The preset time (2-3 seconds) may be changed by the user or a designer's intention. The focal point of the camera 221 may be the same as or similar to the user's eyeline. The controller 280 can be configured to detect a user's gazing time at the interest object and to store the detected gazing time to a memory 170 together with the image corresponding to the interest object.

The controller 280 can be configured to detect a user's facial expression, which has been captured before and/or after based on a time point of capturing an image corresponding to the interest object, as the user's emotion information. The controller 280 can be configured to detect a user's facial expression, which has been captured at a time point of capturing an image corresponding to the interest object, as the user's emotion information.

The controller 280 can be configured to detect a user's utterance, which has been input before and/or after based on a time point of capturing an image corresponding to the interest object, as the user's linguistic expression information. For instance, the controller 280 can be configured to detect a user's utterance, which has been input through the microphone 122, ten seconds ago or ten seconds later, based on a time point of capturing an image corresponding to the interest object, as the user's linguistic expression information. The controller 280 can be configured to detect a user's utterance, which has been input through the microphone 122, from ten seconds ago to ten seconds later, based on a time point of capturing an image corresponding to the interest object, as the user's linguistic expression information.

The controller 280 can be configured to convert a user's utterance, which has been input through the microphone 122 before and/or after based on a time point of capturing an image corresponding to the interest object, into a text, and detect the text as the user's linguistic expression information. The controller 280 can be configured to turn on the camera 221 at predetermined time periods, and when the user's emotion information and/or the user's linguistic expression information on the interest object is detected while the camera 221 is turned on, automatically capture the image corresponding to the interest object.

The controller 280 can be configured to turn on the camera 221, when a user's input (for instance, a user's utterance, a facial expression (facial muscles), a button operation of a glass-type terminal, a user's gesture, a head movement, a touch input and the like) is received, and to capture an image corresponding to the interest object through the camera 221, when the user's emotion information and/or the user's linguistic expression information on the interest object is detected while the camera 221 is turned on.

The controller 280 can be configured to capture an image corresponding to the interest object through the camera 221 when the user's emotion information and/or the user's linguistic expression information on the interest object is detected, when the current position is a position that has been recorded in a schedule (a message, a messenger, a calendar, a map and the like). For instance, the controller 280 can be configured to automatically turn on the camera 221 when the user's emotion information (for instance, smiley facial expression) and/or the user's linguistic expression information on the interest object (for instance, a latest model phone) is detected, when the current position is a position that has been recorded in a schedule (for instance, an electronic appliances shop), and capture an image corresponding to the interest object through the camera 221. The user's linguistic expression information may be a user's voice accompanied by an exclamation (or designator) such as "Wow! It's a wonderful phone" and the like. The exclamation may be "Oh", "Wow" and the like. The designator may be a pre-designated word such as "Take a picture!" and the like.

The controller 280 can be configured to capture an image corresponding to the interest object through the camera 221 when the user's emotion information and/or the user's linguistic expression information on the interest object is detected, when the current position is one of bookmarked places. For instance, the controller 280 can be configured to automatically turn on the camera 221 when the user's emotion information and/or the user's linguistic expression information on the interest object is detected, when the current position is one of bookmarked places (for instance, A Mart), and capture an image corresponding to the interest object through the camera 221.

The controller 280 can be configured to automatically capture an image corresponding to the interest object through the camera 221, when a user's emotion information and/or a user's linguistic expression information on the interest object is detected, when the current position and time have been recorded in the schedule. For instance, the controller 280 can be configured to automatically capture an image corresponding to the interest object through the camera 221, when a user's emotion information and/or a user's linguistic expression information on the interest object is detected, when the current position and time have been recorded in the schedule (for instance, A Coffee Shop, 13:00 p.m.).

The controller 280 can be configured to turn on the camera 221, when a Near Field Communication (NFC) tag, or Radio Frequency Identification (RFID) information for turning on the camera 221 is received through a near field communication module 114, and capture an image corresponding to the interest object when a user's emotion information and/or a user's linguistic expression information on the interest object is detected while the camera 221 is turned on. The controller 280 can be configured to turn on the camera 221 when information for turning the camera 221 is received from an adjacent device through a near field communication module (for instance, Bluetooth), and capture an image corresponding to the interest object when a user's emotion information and/or a user's linguistic expression information on the interest object is detected while the camera 221 is turned on.

The controller 280 can be configured to turn on the camera 221 when information for turning on the camera 221 is received from a server through a radio communications network, and capture an image corresponding to the interest object when a user's emotion information and/or a user's linguistic expression information on the interest object is received while the camera 221 is turned on.

The controller 280 can be configured to turn on the camera 221 based on a user's gesture (for instance, a user's gesture using hands (or fingers) or a user's head movement (for instance, a user's head movement in up, down, left and right directions, and a gradient of a user's head), and capture an image corresponding to the interest object through the camera 221 when a user's emotion information and/or a user's linguistic expression information on the interest object is detected while the camera 221 is turned on. For instance, the controller 280 can be configured to detect a user's head movement through one of a motion sensor, a gyro-sensor, a geomagnetic field sensor, or a combination thereof, and turn on or turn off the camera 221 based on the head movement.

The controller 280 can be configured to turn on the camera 221 when a user's voice for controlling the operation (turn-on or turn-off) of the camera 221 is received (recognized), and capture an image corresponding to the interest object through the camera 221 when a user's emotion information and/or a user's linguistic expression information on the interest object is detected while the camera 221 is turned on. For instance, the controller 280 can be configured to turn on the camera 221 when a user's voice of "camera operation," is recognized, and capture an image corresponding to the interest object through the camera 221 when a user's emotion information and/or a user's linguistic expression information on the interest object is detected while the camera 221 is turned on.

The controller 280 can be configured to turn on the camera 221 in accordance with a pause time at the current position, and capture an image corresponding to the interest object through the camera 221 when a user's emotion information and/or a user's linguistic expression information on the interest object is detected while the camera 221 is turned on. For instance, the controller 280 can be configured to turn on the camera 221 when a user gazes at a "A Coffee Shop" which is the current position for one minute, and capture an image corresponding to the interest object through the camera 221 when a user's emotion information and/or a user's linguistic expression information on the interest object is detected while the camera 221 is turned on. The controller 280 can be configured to turn off the camera 221 when the user moves from the "A Coffee Shop" which is the current position. The set time is not limited to one minute, and may be changed by the user or a designer's intention.

The controller 280 can be configured to turn on the camera 221 based on one or more than two of a user's facial expression, eye blink, biological signal (for instance, heart rate, trembling of skin (or muscles), and brain waves indicative of a user's feeling state), and capture an image corresponding to the interest object through the camera 221 when a user's emotion information and/or a user's linguistic expression information on the interest object is detected while the camera 221 is turned on. For instance, the controller 280 can be configured to detect a user's facial expression through the second camera disposed toward the user's face, and turn on or turn off the camera 221 based on the detected facial expression.

The controller 280 can be configured to detect a user's eye blink through the second camera disposed toward the user's face, turn on the camera 221 when the number of blinks is a first preset number (for instance, three times), and turn off the camera 221 when the number of blinks is a second preset number (for instance, four times). The first and second preset numbers are not limited to the above mentioned numbers, and may be changed by a user or designer's intention. The controller 280 can be configured to detect a user's heart rate through a sensor for sensing a heart rate, turn on the camera 221 when the detected heart rate exceeds or is less than a reference value (for instance, 20 mm Hg/80 mm Hg), and turn off the camera 221 when the detected heart rate is equal to or similar to the reference value (for instance, 120 mm Hg/80 mm Hg). The reference value (for instance, 120 mm Hg/80 mm Hg) is not limited, and may be changed by a user or designer's intention.

The controller 280 can be configured to propose to share an image corresponding to the interest object, and interest information including a user's emotion information and a user's linguistic expression information. For instance, the controller 280 can be configured to display on the display unit 151, a window (for instance, a popup window) proposing to share the interest image, and the interest information including the user's emotion information and the user's linguistic expression information when capturing the image is terminated, the interest object is out of the camera's angle of view, or the current position of the glass-type terminal is changed, and transmit (upload) to share the interest information to the SNS (Social Networking Service) server when a user's input to request to share the interest information (for instance, a user's gesture, a user's head movement, a user's voice command, a touch input, a physical input (for instance, button operations and the like) is received.

The controller 280 can be configured to display the interest information on the display unit 151 when sharing of the interest information is proposed. The controller 280 can be configured to transmit the interest information to a corresponding server using one or more of a Short Networking Service (SNS), a Short Message Service (SMS), a Long Message Service (LMS) and a Multi Message Service (MMS) when a user's input to request to transmit the interest information (for instance, a user's gesture, a user's head movement, a user's voice command, a touch input, a physical input (for instance, button operations and the like) is received.

Whenever the image corresponding to the interest object is captured, the controller 280 can be configured to store, in a memory 170, plural interest information including each captured image, and a user's emotion information and linguistic expression information on each interest object. The plural interest information stored in the memory 170 may be displayed on the display unit 251 or may be transmitted to a corresponding server using one or more of the Short Networking Service (SNS), a Short Message Service (SMS), a Long Message Service (LMS), and a Multi Message Service (MMS) according to the user's request.

Figure 4:
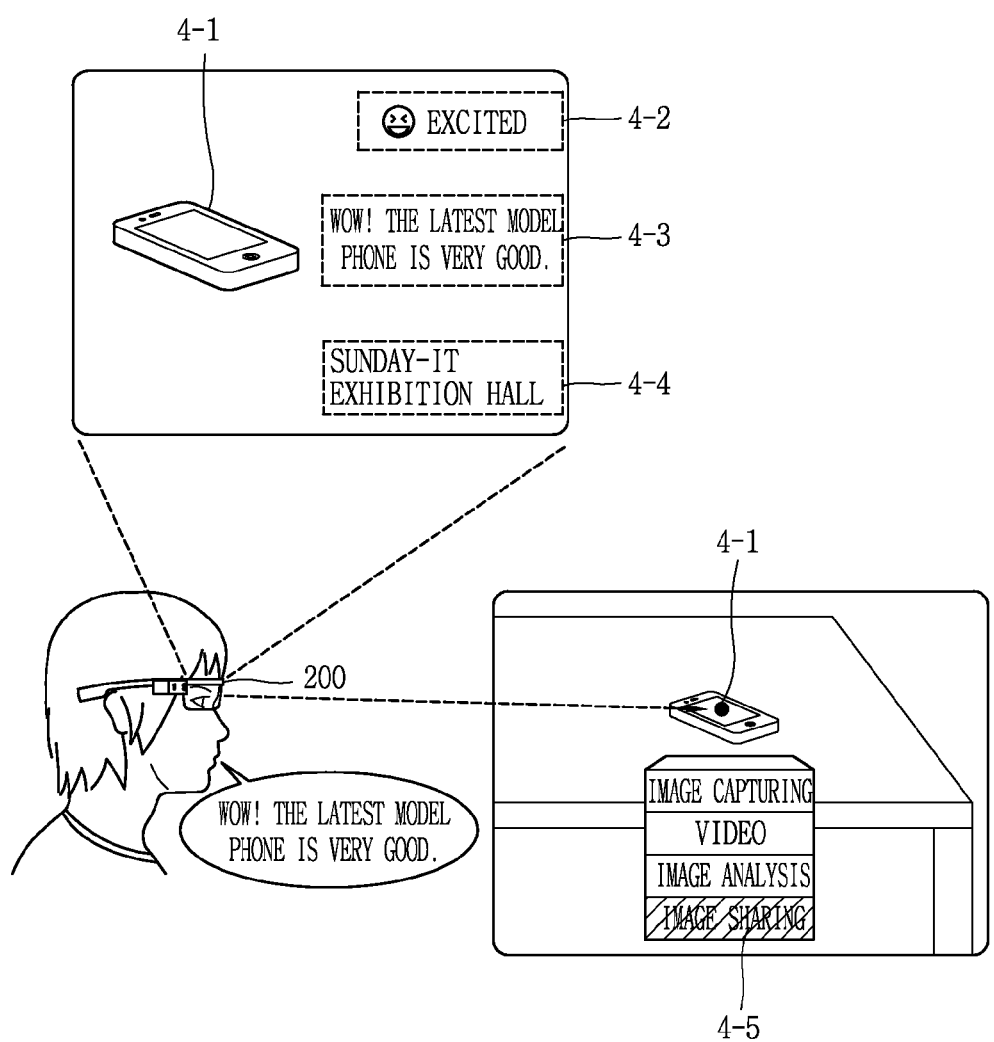
FIG. 4 is a view illustrating interest information according to an embodiment of the present invention.

FIG. 4 is a view illustrating interest information according to an embodiment of the present invention. As shown in FIG. 4, the controller 280 can display on the display unit 251, an image (4-1) corresponding to the interest object, and interest information including a user's emotion information (4-2) and a user's linguistic expression information (4-3) when a user's input is received, capturing an image is terminated, the interest object is out of the camera's angle of view, or the current position of the glass-type terminal is changed. For instance, the controller 280 can capture a phone image (4-1) corresponding to the interest object when the user's eyeline is toward the interest object (for instance, phone), and display on the display unit 251, the user's emotion information and the user's linguistic expression information (for instance, wow, good and the like) detected based on a capturing point of the phone image (4-1), as interest information. The user's emotion information (4-2) may include one or more of a character, an icon, an emoticon, a still image, and a moving image corresponding to the user's emotion information.

The interest information may further include a current position, a weekday, a date, and time information (4-4). For instance, the controller 280 can acquire a current position, a weekday, a date and time information when capturing the image (4-1) corresponding to the interest object, and display the acquired current position, the weekday, the date and the time on the display unit 251 together with the interest information, or transmit the acquired current position, the weekday, the date and the time to the corresponding server (for instance, an SNS server) together with the interest information. The controller 280 can be configured to display on the display unit 251 when the user's eyeline is toward the interest object, a list (4-5) including a capturing icon for capturing the interest object, a video capturing icon for capturing moving images on the interest object, an image analyzing icon for analyzing an image corresponding to the interest object, and an image sharing icon for sharing an image corresponding to the interest object.

The controller 280 can display a web searching result on an image corresponding to the interest object, at a position adjacent to the image (4-1), i.e. a name, a brand and price information of the interest object, when the image analyzing icon is selected. The controller 280 can transmit the emotion information and linguistic expression information related to an image to the corresponding server (for instance, SNS server) together with the image corresponding to the interest object when the image sharing icon is selected, so as to share not only the image but also the emotion information and the linguistic expression information related to the image.

The controller 280 can be configured to search images related to the user's emotion information (4-2) from the plural interest information stored in the memory 170 when a user gazes at the user's emotion information (4-2), and display the searched images on the display unit 251.

Figure 5A:
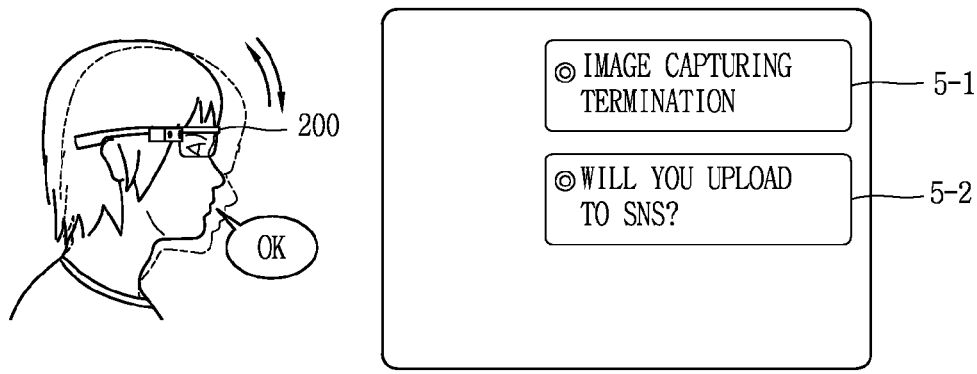
FIGS. 5A and 5B are views illustrating a method to share (or upload) interest information according to an embodiment of the present invention.
Figure 5B:
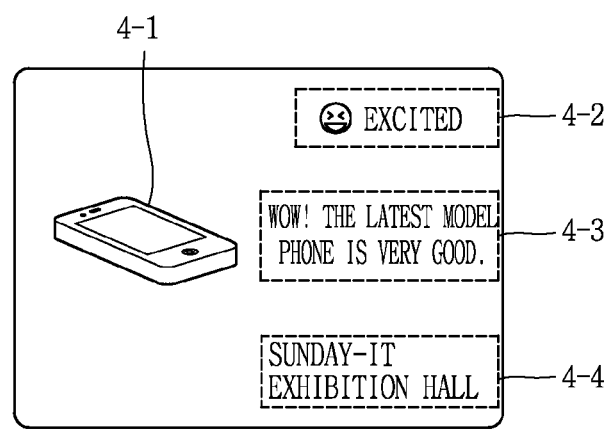

Hereinafter, a method for proposing to share (or upload) the interest information will be described with reference to FIGS. 5A and 5B. In particular, FIGS. 5A and 5B are views illustrating a method for sharing (or uploading) interest information according to an embodiment of the present invention;

As shown in FIGS. 5A and 5B, the controller 280 can prompt a user to share acquired interest information by uploading (transmitting) the acquired interest information to a corresponding server (for instance, SNS server) when capturing an image (FIG. 5B) corresponding to the interest object is terminated, a movement of the place occurs from the interest object, or the image (interest image) is out of the camera's angle of view (user's view) after capturing the image corresponding to the interest object is terminated.

The controller 280 can share the acquired interest information (FIG. 5B) by automatically uploading (transmitting) the acquired interest information to a peripheral device (for instance, a glass-type terminal, a smart phone, a notebook computer, and a terminal for digital broadcasting) or a device at a pre-designated place (for instance, a home network device, a server and the like) when capturing the image corresponding to the interest object is terminated, a movement of the place occurs from the interest object, or the image (interest image) is out of the camera's angle of view (user's view) after capturing the image corresponding to the interest object is terminated.

The controller 280 can prompt the user to upload (transmit) the acquired interest information to the corresponding server when the image (interest image) is out of the camera's angle of view (user's view) for a predetermined time after capturing the image corresponding to the interest object is terminated. For instance, the controller 280 can terminate capturing the image when a movement of the place occurs from the interest object, display notification information (5-1) informing that capturing the image is terminated due to the movement of place on the display unit 151, and display information (5-2) prompting the user to upload (transmit) the acquired interest information to the corresponding server on the display unit 151.

The controller 280 can display the interest information to be uploaded (transmitted) to the corresponding server, on the display unit 251 when receiving a user's input to request to upload (transmit) the acquired interest information to the corresponding server in response to the proposal information (5-2). For instance, the controller 280 can display the interest information to be uploaded (transmitted) to the corresponding server, on the display unit 251 when a user's input to request to upload (transmit) the acquired interest information to the corresponding server, for example, a user's voice, a head movement (for instance, a nod of head and the like), a touch input, and a button operation is received in response to the proposal information (5-2). The controller 280 can share the interest information by uploading (transmitting) the displayed interest information to the corresponding server when the user's input to request to transmit the displayed interest information to the corresponding server is received.

Hereinafter, another method for prompting the user to share (or upload) the interest information will be described with reference to FIGS. 6A through 6C. In particular, FIGS. 6A, 6B and 6C are views illustrating a method to upload interest information according to an embodiment of the present invention.

Figure 6A:
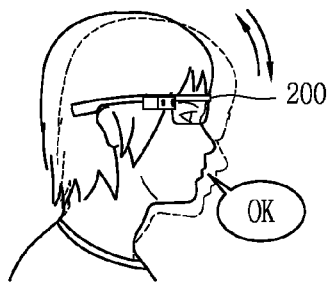
FIGS. 6A, 6B, and 6C are views illustrating a method to upload interest information according to an embodiment of the present invention.
Figure 6A:
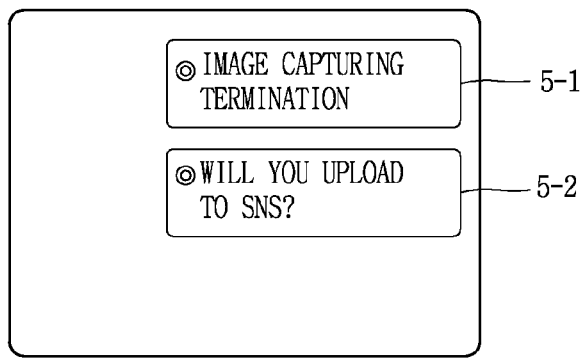

As shown in FIG. 6A, the controller 280 can prompt a user to upload (transmit) acquired interest information to a corresponding server when capturing the images corresponding to the interest object is terminated, a movement of the place occurs from the interest object, or an image (interest image) is out of the camera's angle of view (user's view) after capturing the image corresponding to the interest object is terminated. The controller 280 can prompt a user to upload (transmit) the acquired interest information to the corresponding server when the image (interest image) is out of the camera's angle of view (user's view) for a predetermined time after capturing the image corresponding to the interest object is terminated. For instance, the controller 280 can terminate capturing the image when a movement of the place occurs from the interest object, display notification information (5-1) informing that capturing the image is terminated due to the movement of place on the display unit 251, and display information to prompt the user to upload (transmit) the acquired interest information to the corresponding server on the display unit 251.

Figure 6B:
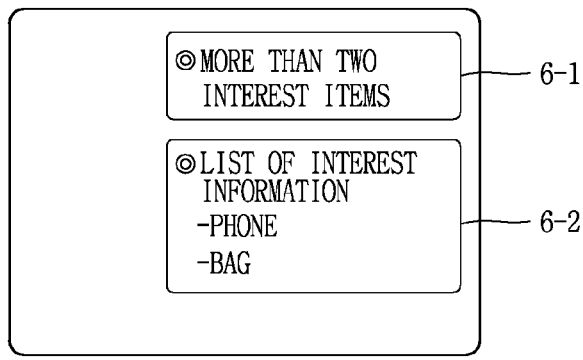

As shown in FIG. 6B, the controller 280 can display on the display unit 251, an interest information list (6-2) including brief information (for instance, an interest image, a title of an interest image and the like) of plural interest information together with notification information (6-1) informing existence of plural interest information, if there are plural interest information to be uploaded (transmitted) when a user's input to request to upload (transmit) the acquired interest information to the corresponding server in response to the proposal information (5-2) is received.

Figure 6C:
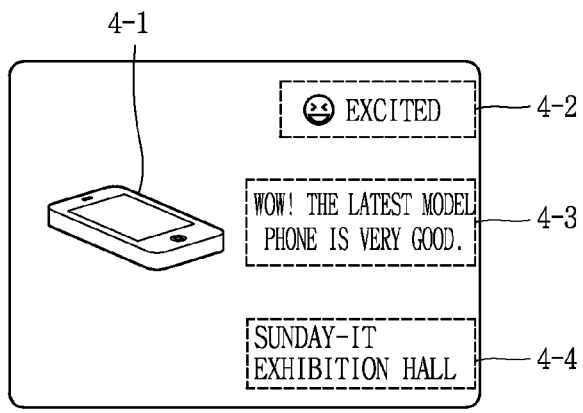

As shown in FIG. 6C, the controller 280 can display on the display unit 251, specific interest information (an interest image, emotion information, linguistic expression information, position information, information including an owner of a peripheral device and the like) corresponding to the specific brief information when the user's eyeline is toward specific brief information (for instance, phone) in the interest information list (6-2). The controller 280 can upload (transmit) the specific interest information to the corresponding server when a user's input, i.e., a user' voice, a head movement (for instance, head nodding and the like), a touch input, a button operation and the like, to request to upload (transmit) the specific interest information to the corresponding server is received.

The controller 280 can set the order of priority (the order of interest) on the plural interest information based on the user's gazing time with respect to the interest image, the amount of data of the user's linguistic expression information, the heart rate and the like, and may be configured to display in a row the plural interest information on the display unit 251 in line with the set order of priority. For instance, the controller 280 can set the order of priority (the order of interest) to the plural interest information, by assigning interest information at which a user has gazed for a longest time, with a highest priority, and display the plural interest information on the display unit 251 according to the order of priority. The controller 280 can upload (transmit) the specific interest information to the corresponding server when a user's input, i.e., a user's voice, a head movement, a touch input, a button operation and the like, to request to upload (transmit) the specific interest information to the corresponding server, among the plural interest information which have been displayed on the display unit 151 according to the order of priority, is received.

The controller 280 can set the order of priority (the order of interest) on the plural interest information by assigning interest information having a largest amount of user's linguistic expressions, with a highest priority, and can display the plural interest information on the display unit 251 according to the order of priority. The controller 280 can upload (transmit) the specific interest information to the corresponding server when a user's input, i.e., a user's voice, a head movement (for instance, a head nodding), a touch input, a button operation and the like, is received, the user's input requesting to upload (transmit) the specific interest information, among the plural interest information which have been displayed on the display unit 251.

The controller 280 can set the order of priority (the order of interest) on the plural interest information, by endowing interest information having a highest heart rate with a highest priority, and may be configured to display the plural interest information on the display unit 251 according to the order of priority. The controller 280 can upload (transmit) the specific interest information to the corresponding server when a user's input, i.e., a user's voice, a head movement (for instance, a head nodding), a touch input, a button operation and the like is received, the user's input requesting to upload (transmit) the specific interest information among the plural interest information which have been displayed on the display unit 251.

The controller 280 can set the order of priority (order of interest) on the plural interest information, based on a combination of a user's gazing time, the amount of user's linguistic expressions, a heart rate and the like, with respect to interest information.

Hereinafter, a method of selecting interest information to be uploaded (transmitted) to a corresponding server will be described with reference to FIGS. 7A and 7B. In particular, FIGS. 7A and 7B are views illustrating a method to select interest information to be uploaded (transmitted) to a corresponding server according to an embodiment of the present invention.

Figure 7A:
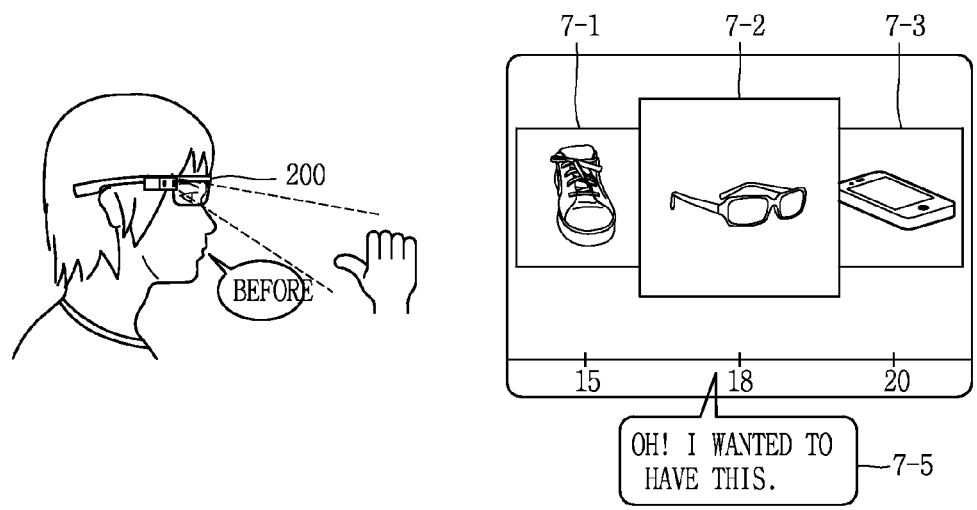
FIGS. 7A and 7B are views illustrating a method to select interest information to be uploaded to a corresponding server according to an embodiment of the present invention.

As shown in FIG. 7A, the controller 280 can display plural interest information on a timeline in response to a user's request, and move the interest information displayed on the timeline in one direction among upper, lower, left and right directions according to a user's input, i.e., a user's gesture, a user's voice, a head movement, a touch input, a button operation and the like, or select specific interest information displayed on the timeline.

The controller 280 can display a currently selected interest image (7-2) at the center of the timeline in an enlarged manner and at the same time output linguistic expression information (7-5) related to the currently selected interest image (7-2) via the sound output unit 152. And the controller 280 can display a previous interest image (7-1) at the center of the timeline in an enlarged manner when a user's input for selecting the previous interest image (7-1), i.e., a user's gesture, a user's facial expression, a user's voice, a head movement, a touch input, a button operation and the like, is received, and at the same time output linguistic expression information related to the previous interest image (7-1) via the sound output unit 152.

Figure 7B:
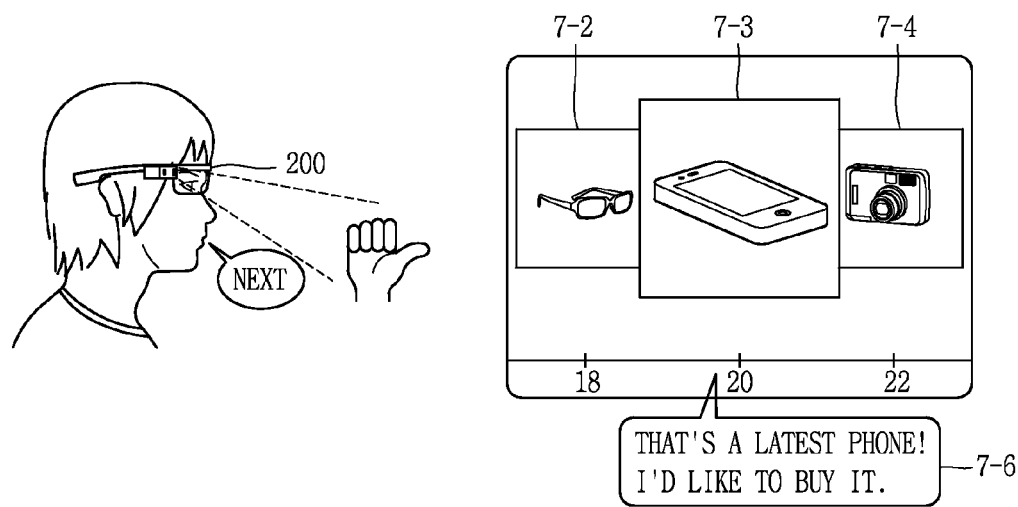

As shown in FIGS. 7A and 7B, the controller 280 can display the currently selected interest image (7-2) at the center of the timeline in an enlarged manner and at the same time output the linguistic expression information (7-5) related to the currently selected interest image (7-2) via the sound output unit 152, and display a next interest image (7-3) at the center of the timeline in an enlarged manner when a user's input for selecting the next interest image (7-3), i.e., a user's hand gesture, a user's facial expression, a user's voice, a head movement, a touch input, a button operation and the like, is received, and at the same time output linguistic expression information (7-6) related to the next interest image (7-3) via the sound output unit 152.

Hereinafter, another method of selecting interest information to be uploaded (transmitted) to a corresponding server will be described with reference to FIGS. 8A and 8B. In particular, FIGS. 8A and 8B are views illustrating another method to select interest information to be uploaded (transmitted) to a corresponding server according to an embodiment of the present invention.

Figure 8A:
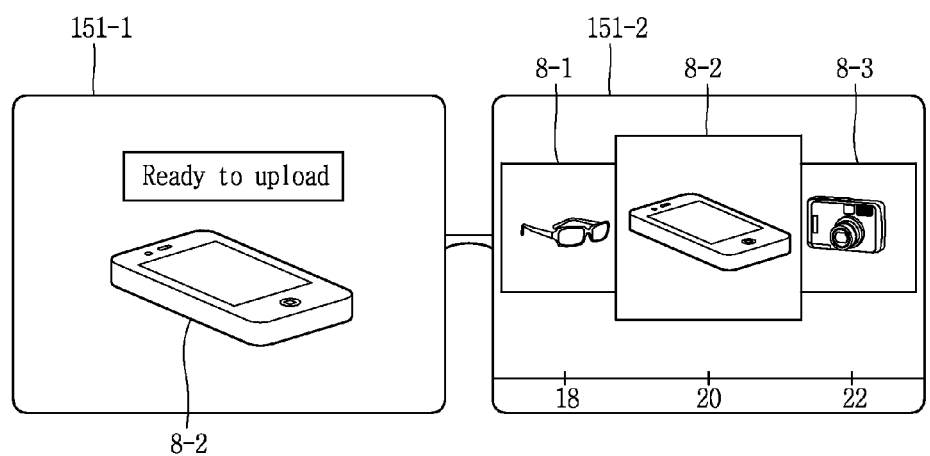
FIGS. 8A and 8B are views illustrating another method to select interest information to be uploaded to a corresponding server according to an embodiment of the present invention.

As shown in FIG. 8A, assuming a glass-type terminal 200 includes a first display unit (151-1) and a second display unit (151-2) which are disposed to correspond to the left and right eyes, respectively, the controller 280 can display plural interest information (8-1, 8-2 and 8-3) at the center of a timeline in response to a user's request according to interest information acquisition time, select specific interest information (8-2) among the plural interest information in response to a first user's input (for instance, the user's gesture, a user's voice, a head movement, a touch input, a button operation and the like), and display the selected specific interest information (8-2) on a first display unit (151-1) as a candidate group to be uploaded to a corresponding server when a second user's input (for instance, a head movement from the right to the left) is received.

Figure 8B:
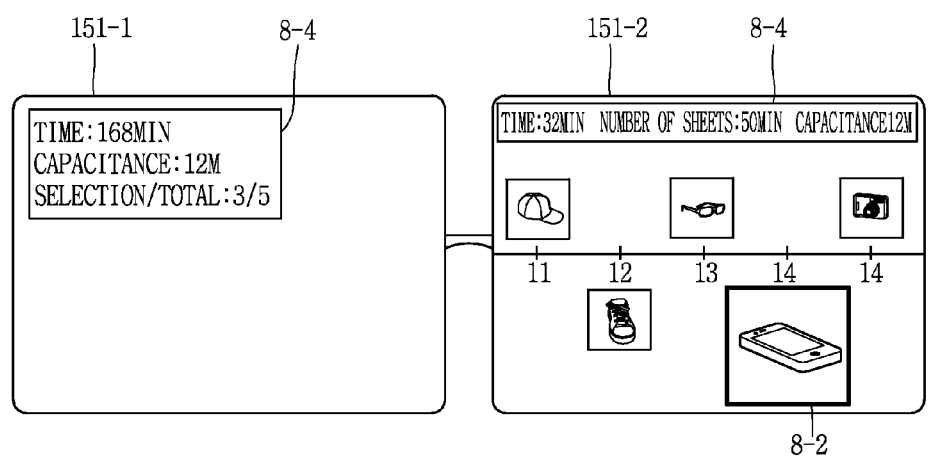

As shown in FIG. 8B, assuming a glass-type terminal 200 includes a first display unit (151-1) and a second display unit (151-2) which are disposed to correspond to the left and right eyes, respectively, the controller 280 can display plural interest information (8-1, 8-2 and 8-3) at the center of a timeline of the second display unit (151-2) in response to a user's request according to interest information acquisition time (for instance, a user's gazing time and a time duration to stay at a corresponding position), and can display the attribute information (for instance, a data capacity of the specific interest information (8-2), a reproducing time of video, the number of images and the like) of the selected specific interest information (8-2) on the first display unit (151-1) and/or the second display unit (151-2) when the specific interest information is selected among the plural interest information in response to a first user's input (for instance, a user's gesture, a user's voice, a head movement, a touch input, a button operation and the like) is selected.

The controller 280 can change differently a display time of each of the plural interest information (or plural interest images) (8-1, 8-2 and 8-3) displayed on the timeline in the order of interest. For instance, the controller 280 can display the first interest information (8-1) on the second display unit (151-2) for ten seconds when a user's gazing time at an interest image included in the first interest information (8-1) among the plural interest information (8-1, 8-2 and 8-3)

displayed on the timeline, is ten seconds, and may be configured to display the second interest information (8-2) on the second display unit (151-2) for three seconds when a user's gazing time at an interest image included in the second interest information (8-2) is three seconds. The display time of the plural interest information (8-1, 8-2 and 8-3) may be changed according to a user or designer's intention.

The controller 280 can guide to autofocus on one or more recommended interest information among the plural interest information (8-1, 8-2 and 8-3) or enlarge the recommended interest information so as to recommend in advance the interest information to be uploaded (shared). A condition to recommend a specific interest image among the plural interest information or images (8-1, 8-2 and 8-3) may include one of a user's gazing time at the interest image, a composition of the interest image, a brightness of the interest image, a resolution of the interest image, a high heart rate when capturing the interest image, brain waves in response to an emotional condition (for instance, good, discomfort and the like) when capturing the interest image, and the like, or a combination thereof.

The controller 280 can display two or more most recommended interest images among the recommended interest images in an enlarged manner. Thus, a user can select the recommended interest images, or move to other items (for instance, an interest image other than the recommended interest images, emotion information, a user's linguistic expression information and the like) to select a desired item therefrom. For instance, the controller 280 can select a user's desired recommended interest image or a user's desired item based on a head movement leaning in the left or right direction, a motion of facial muscles, a user's voice, a motion to gaze at an interest image other than the recommended interest image, etc.

Hereinafter, a method for editing the interest information will be described with reference to FIGS. 9A and 9B. In particular, FIGS. 9A and 9B are views illustrating another method for editing interest information according to an embodiment of the present invention.

Figure 9A:
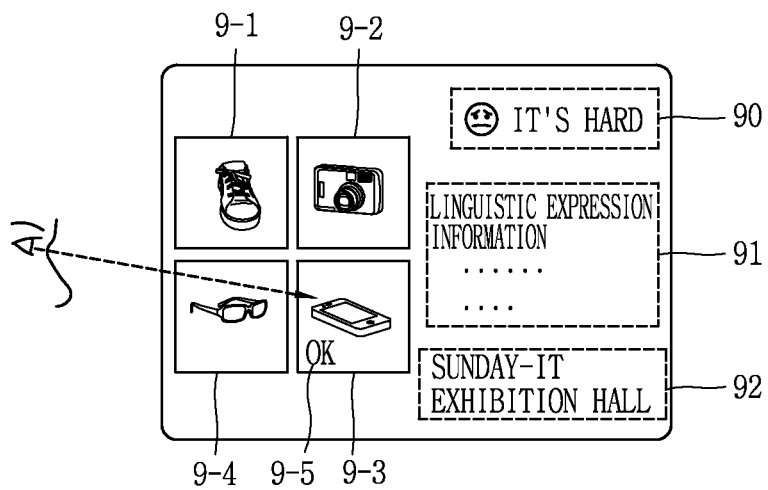
FIGS. 9A and 9B are views illustrating a method to edit interest information according to an embodiment of the present invention.
Figure 9B:
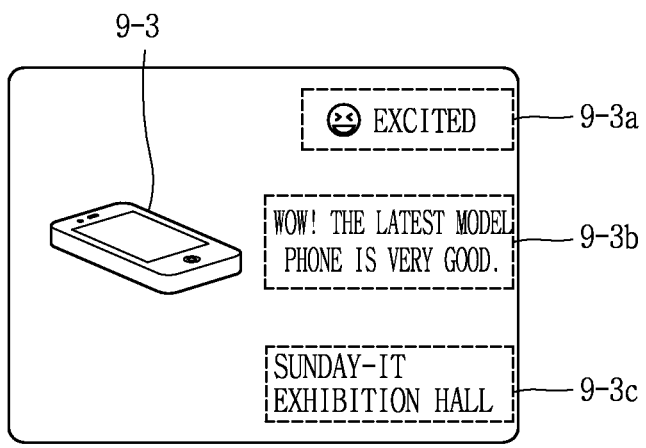

As shown in FIG. 9A, the controller 280 can display plural interest information accumulated in the memory 170 on the display unit 151 in response to a user's request. The controller 280 can display the plural interest information which have been accumulated from a recent turn-on time to a recent turn-off time of the camera 221, on the display unit 151 in response to a user's request. For instance, the controller 280 can display interest images (9-1, 9-2 and 9-3) included in the accumulated plural interest information on a first region of the display unit 151 in the order of interest or in the order of capturing time of the interest images, display user's emotion information (90) included in the accumulated plural interest information on a second region of the display unit 151 in the order of interest or in the order of detecting time of the user's emotion information, and display a user's linguistic expression information (91) included in the accumulated plural interest information on a third region of the display unit 151 in the order of interest or in the order of detecting time of a user's linguistic expression information.

The controller 280 can display information (92), i.e., a capturing position, a capturing time, a capturing date, information on a peripheral device (including personal information), a user's voice recording or textualized voice when capturing each of the interest images (9-1, 9-2, 9-3 and 9-4) included in the accumulated interest information, on a fourth region of the display unit 180 in the order of interest or in the order of time.

The controller 280 can, when a user's eyeline is toward a specific image among the interest images (9-1, 9-2, 9-3 and 9-4) for a preset time, display notification information (9-5) (for instance, an OK icon, indication of a thick line or a different color at the edge, etc.) (9-5) informing that the specific image has been selected on the specific image, display application information for editing the specific image on a position close to the specific image, and when the application information is selected by a user, execute an application corresponding to the selected application information so that the user can edit the specific image using the application.

The controller 280 can, when a user's eyeline is toward a specific image among the interest images (9-1, 9-2, 9-3 and 9-4) for a preset time, display images related to the specific image at the periphery of the specific image, and when one or more images are selected among the images displayed at the periphery, change the specific image into the selected one or more images.

The controller 280 can display, when a user's eyeline is toward user's linguistic expression information 91 or a third region for a preset time, display notification information (for instance, an OK icon, or indication of a thick line or a different color at the edge, etc.) informing that the user's linguistic expression information 91 has been selected, on the third region, request to the user to input a user's new linguistic expression information, and when the user's linguistic expression information is input via the microphone 122 in response to the request, display the user's new linguistic expression information instead of the user's linguistic expression information 91 so as to edit the user's linguistic expression information 91.

The controller 280 can, when the user's eyeline is toward the information (92), (i.e., the capturing position, the capturing time, the capturing date and the like) or the fourth region for a preset time, display notification information (for instance, an OK icon, indication of a thick line, or a different color at the edge) informing that the information (92), (i.e., a capturing position, a capturing time, a capturing date and the like) has been selected, on the fourth region, request the user to input information on a new capturing position, a new capturing time, a new capturing date and the like, and when the information on a new capturing position, a new capturing time, a new capturing date and the like is input in response to the request, display the new information instead of the information (92) so as to edit the information (92).

As shown in FIG. 9B, the controller 280 can, when a user's input (for instance, a user's gesture, a user's voice, a head movement, an eye blink, a touch input, a button operation and the like) to request to display only specific interest information corresponding to a specific interest image (for instance, 9-3) on the display unit 151 is received after the user's eyeline has been fixed to a specific interest image (for instance, 9-3) among the plural interest images (9-1, 9-2, 9-3 and 9-4) for a preset time, display the specific interest image (for instance, 9-3), a user's emotion information (9-3*a*) and a user's linguistic expression information (9-3*b*) related to the specific interest information (for instance, 9-3), and the information (9-3*c*) related to a capturing position, a capturing time, and a capturing date with respect to the specific interest image (for instance, 9-3) on the display unit 251.

Hereinafter, another method for editing interest information will be described with reference to FIGS. 10A through 10C. In particular, FIGS. 10A and 10C are views illustrating another method for editing interest information according to an embodiment of the present invention.

Figure 10A:
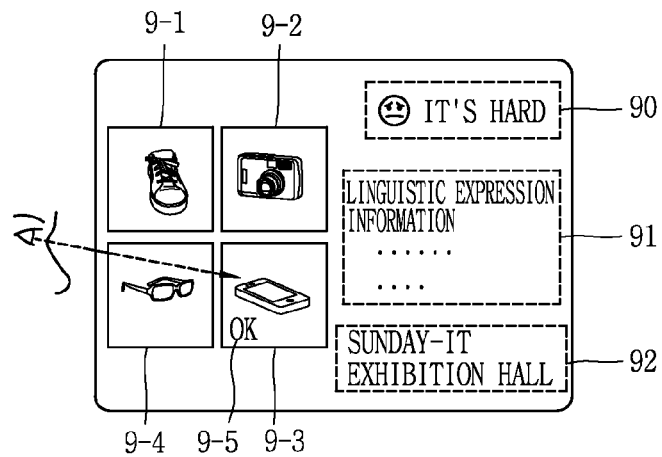
FIGS. 10A, 10B and 10C are views illustrating another method to edit interest information according to an embodiment of the present invention.

As shown in FIG. 10A, the controller 280 can display plural interest information accumulated in the memory 170 on the display unit 251 in response to a user's request. For instance, the controller 280 can display interest images (9-1, 9-2, 9-3 and 9-4) included in the accumulated plural interest information in a first region of the display unit 251 in the order of capturing time of the interest images, display a user's emotion information (90) included in the accumulated plural interest information in a second region of the display unit 251 in the order of detecting time of a user's emotion information, and display a user's linguistic expression information (91) included in the accumulated plural interest information in a third region of the display unit 251 in the order of detecting time of a user's linguistic expression information. The controller 280 can display information (92) regarding a capturing position, a capturing time, and a capturing date of each of the interest images (9-1, 9-2, 9-3 and 9-4) included in the accumulated plural interest information in a fourth region of the display unit in the order of time.

The controller 280 can, when a user's eyeline is toward a specific image among the interest images (9-1, 9-2, 9-3 and 9-4) for a preset time or when a user input regarding a user's utterance (a user's voice), a facial expression (facial muscles), a button operation, an eye blink and the like for selecting the specific image is received, select the specific image and convert the current display mode into an edition mode.

Figure 10B:
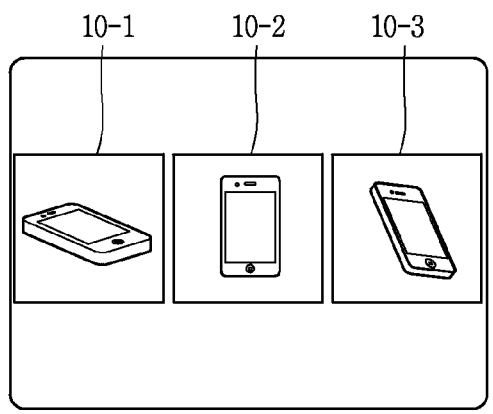
Figure 10C:
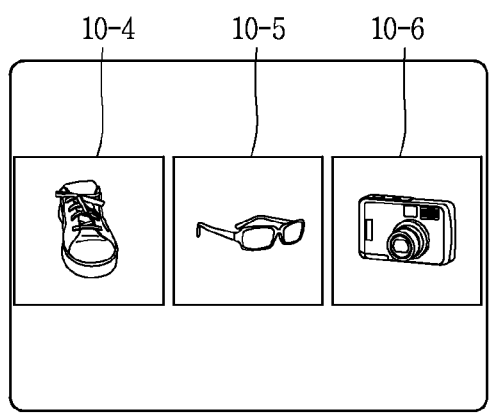

As shown in FIG. 10B, the controller 280 can, when a user's input (for instance, one of a repeated movement of head in the upper and lower directions, a distorted facial expression, a user's voice and a user's gesture) to request to edit the specific image in the editing mode is received, display images related to the selected specific image on the display unit 251. The user can edit the selected specific image by selecting a desired image among the displayed images and substituting the desired image by the selected specific image. For instance, the controller 280 can, when a user's input (for instance, one of a repeated movement of head in the upper and lower directions, a distorted facial expression, a user's voice and a user's gesture) to request to edit the specific image in the editing mode is received, detect images (for instance, phone images) (10-1, 10-2 and 10-3) corresponding to objects having different image capturing compositions among objects which are the same as interest objects (for instance, a phone) corresponding to the selected specific image (for instance, a phone image) (9-3) from the memory 170, and display the detected images on the display unit 251.

The controller 280 can, when a user's input (for instance, one of a repeated movement of head in the upper and lower directions, a distorted facial expression, a user's voice and a user's gesture) to request to edit the specific image in the editing mode is received, request images (for instance, phone images) corresponding to objects having different image capturing compositions among objects which are the same as interest objects (for instance, a phone) corresponding to the selected specific image (for instance, a phone image) from a server (for instance, an image-based searching server), receive the images corresponding to the objects having different capturing compositions, and display the received images on the display unit 251.

As shown in FIG. 10C, the controller 280 can, when a specific image is selected, or a user's input (for instance, one of a repeated movement of head in the left and right directions, a user's voice and a user's gesture) to request images in the order of interest (the order of priority) in the editing mode is received, detect images (10-4, 10-5 and 10-6) in the order of interest (for instance, the order of user's preference) from the memory (or the server) 170, and display the detected images (10-4, 10-5 and 10-6) on the display unit 251 in an array in the order of interest.

In addition, embodiments of the present invention are capable of implementing a computer readable code in a media in which programs are recorded. The computer readable media include all kinds of recording devices in which data readable by a computer system are stored. Examples of the computer readable media are a Hard Disk Drive (HDD), a Solid State Disk (SSD), a Silicon Disk Drive (SSD), a ROM, a RAM, a CD-ROM, a magnetic tape, a floppy disk, an optical data storage device, and include a type in the form of a carrier wave (for instance, transmission via internet). Further, the controller 280 of the computer terminal may be included.

The foregoing embodiments and advantages are merely and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A glass-type mobile terminal, comprising:
a frame body configured to be worn as glasses by a user;
a display mounted on the frame body;
a camera mounted on the frame body; and
a controller configured to:
detect user's emotion information and user's linguistic expression information on an object, and
control the camera to automatically capture an image corresponding to the object currently viewed with the glass-type mobile terminal based on the linguistic expression information and the emotion information of the user on the currently viewed object,
wherein the controller is configured to detect a user's facial expression when the user is viewing the object and output the detected facial expression as the emotion information on the object and to recognize an utterance of the user when the user is viewing the object, and detect the recognized utterance as the user's linguistic expression information,
wherein the controller is further configured to detect a user's gazing time at the currently viewed object, store the detected gazing time to a memory together with the image corresponding to the currently viewed object, set an order of priority on the at least one image based on the user's gazing time with respect to the currently viewed object, and differently display the at least one image in the order of priority, and
wherein the controller is further configured to:

display the emotion information of the user, the image and the linguistic expression information of the user on the display, display a plurality of images related to the emotion information on the display when a user gazes at the emotion information for a preset time, and differently change a display size of each of the plurality of images according to an order of interest of the user.

2. The glass-type mobile terminal of claim 1, wherein the controller is further configured to:

prompt the user to share object interest information about the object captured by the camera, when image capturing is terminated, the object has moved out of an angle view of the camera, or a current position of the glass-type terminal is changed, and wherein the object interest information includes the captured image, the emotion information and the linguistic expression information.

3. The glass-type mobile terminal of claim 2, wherein the controller is further configured to:

display the object interest information on the display unit.

4. The glass-type mobile terminal of claim 1, wherein the controller is further configured to:

control the camera to automatically capture the image of the object, when a current position of the glass-type terminal is a preregistered position.

5. The glass-type mobile terminal of claim 1, wherein the controller is further configured to:

control the camera to automatically capture the image of the object, based on the user's biological signal.

6. The glass-type mobile terminal of claim 1, wherein the controller is further configured to:

control the camera to automatically capture the image of the object, based on one of the user's facial expression, eye blink, voice, heart rate, and brain waves.

7. The glass-type mobile terminal of claim 1, wherein the controller is further configured to:

control the camera to automatically capture a plurality of images of the object at preset periods.

8. The glass-type mobile terminal of claim 1, wherein the controller is further configured to:

display the utterance as text on the display.

9. The glass-type mobile terminal of claim 1, wherein the controller is further configured to:

display an icon indicating the emotion information of the user when the image capturing is terminated, the object is out of an angle of view of the camera, or a current position of the glass-type terminal is changed.

10. The glass-type mobile terminal of claim 9, wherein the controller is further configured to display the current position of the glass-type terminal and character information detected from the current position of the glass-type terminal on the display unit.

11. The glass-type mobile terminal of claim 2, wherein the controller is further configured to:

transmit the object interest information using one or more of a Social Networking Service (SNS), a Short Message Service (SMS), a Long Message Service (LMS) and a Multi Message Service (MMS) based on a positive response to the prompt to the user to share the object interest information.

12. The glass-type mobile terminal of claim 1, wherein the controller is further configured to:

change differently a display time of each of the plurality of images according to the order of interest.

13. The glass-type mobile terminal of claim 1, wherein the controller is further configured to:

output, when one of the image, the emotion information and the linguistic expression information is selected, the linguistic expression information through a sound output unit as a voice.

* * * * *